(12) United States Patent
Khlopkov

(10) Patent No.: US 10,699,180 B2
(45) Date of Patent: Jun. 30, 2020

(54) SYSTEM FOR IDENTIFICATION OF ITEMS USING UNIQUE OPTICAL ELEMENT

(71) Applicant: Konstantin Khlopkov, Saint Petersburg (RU)

(72) Inventor: Konstantin Khlopkov, Saint Petersburg (RU)

(*) Notice: Subject to any disclaimer, the term of this patent is extended or adjusted under 35 U.S.C. 154(b) by 0 days.

(21) Appl. No.: 16/442,506

(22) Filed: Jun. 16, 2019

(65) Prior Publication Data
US 2019/0392284 A1     Dec. 26, 2019

Related U.S. Application Data

(60) Provisional application No. 62/689,914, filed on Jun. 26, 2018.

(51) Int. Cl.
*G06K 19/16*     (2006.01)
*G06K 19/06*     (2006.01)

(52) U.S. Cl.
CPC ....... *G06K 19/16* (2013.01); *G06K 19/06037* (2013.01)

(58) Field of Classification Search
None
See application file for complete search history.

(56) References Cited

U.S. PATENT DOCUMENTS

2008/0025594 A1*   1/2008   Metzger ............... G07D 7/06
                                                      382/141

* cited by examiner

*Primary Examiner* — Kristy A Haupt

(57) ABSTRACT

A system for identification of items and products is provided, comprising an optical identification mark associated physically and in a database with a specific item or product, wherein the optical identification mark comprises an optical element with unique refractive properties and a laser beam source and said optical identification mark is configured to transmit a laser beam emitted by the laser beam source through said optical element and surrounding medium to create a light beam with unique light and shape properties that is utilized as a token for identification of the specific optical identification mark and subsequent identification of the associated specific item or product.

3 Claims, 5 Drawing Sheets

SYSTEM FOR IDENTIFICATION OF ITEMS USING UNIQUE OPTICAL ELEMENT

CROSS REFERENCE TO RELATED APPLICATIONS

Figure 1:
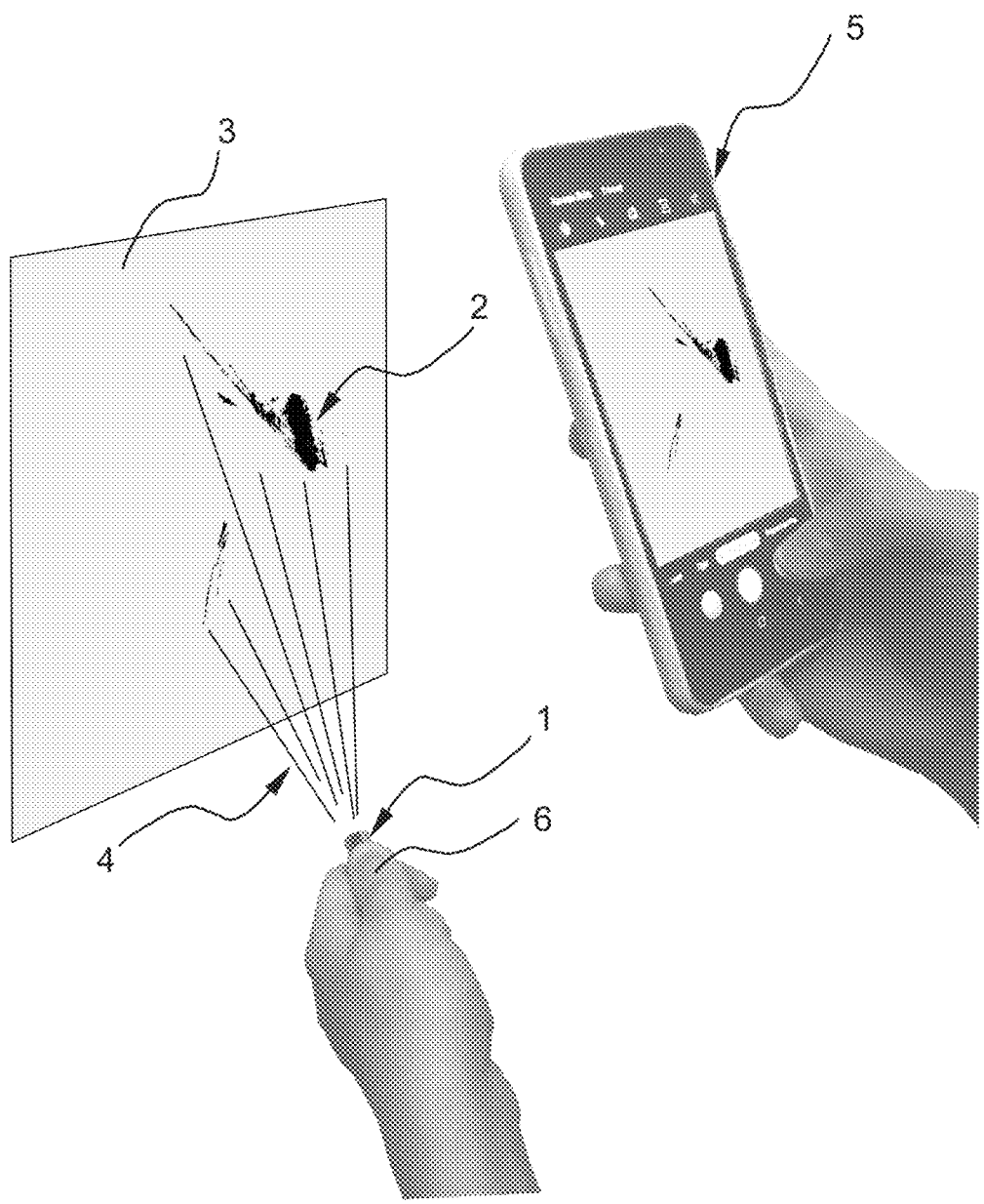

This application claims the benefit of U.S. provisional application Ser. No. 62/689,914 filed on Jun. 26, 2018.

BACKGROUND OF THE INVENTION

1. Field of the Invention

The invention relates to the field of identification and recognition of counterfeit products, and specifically to methods and devices for labeling and identification of manufactured items, objects, goods and products.

2. Discussion of the State of the Art

It is often necessary to uniquely mark certain manufactured items, objects, goods and products, such as various tangible objects, documents or identification cards, for subsequent identification, tracking, verification or other purposes.

Such existing technologies as applying a barcode, using of microchips, identification based on RFID (Radio Frequency Identification) tags, used for the unique tagging of manufactured objects, goods and products, have several disadvantages and sometimes do not provide the desired result. For example, existing technologies may be too complex for some applications, may not provide enough codes or sufficient security and protection against copying performed by potential forgers.

Thus, it would be desirable to obtain a tagging technology that includes the use of an identification mark with unique properties that would be extremely difficult to copy; at the same time, the technology should enable users to recognize the identification mark through relatively simple means for later familiarization with the information about items and products associated with a particular identification mark.

SUMMARY OF THE INVENTION

In an embodiment of present invention a system for identification of items and products is provided, comprising:
a) an optical identification mark associated with a specific item or product, comprising:
  an optical element with unique refractive properties that includes one or more transparent objects of irregular random shape randomly conjugated to each other and the refractive index of the material of said transparent objects differs from the refraction index of the medium surrounding the said transparent objects,
  a laser beam source,
wherein said optical element and said laser beam source are fixed in the optical identification mark in a position that allows a laser beam emitted by said laser beam source to pass through said optical element with an output of a light beam with unique properties, formed by said laser beam refracted by said optical element, beyond said optical identification mark, followed by identification of the specific optical identification mark by identifying its unique refractive image appearing on a surface (screen surface) placed in the direction of said light beam propagation, providing the user of system information on the specific item or product associated with the specific optical identification mark;
b) a database of said unique refractive images of optical identification marks array, wherein each of optical identification marks in turn is associated with a specific item or product;
c) a mobile device with a built-in camera, built-in means of communication with said database and built-in means of providing information to the user of system, designed to capture said unique refractive image that appears on said screen surface, transfer said unique refractive image to said database, as well as receive and provide the user of system information on the specific item or product associated with the specific optical identification mark in said database;
d) a central processor designed to determine the characteristics of said unique refractive image of the specific optical identification mark captured by said mobile device camera in order to search for the corresponding unique refractive image stored in said database of the optical identification marks array, each of which in turn is associated with a specific item or product.

In another embodiment of present invention a system for identification of items is provided, farther comprising:
  a casing intended for mutual fixation of the elements of the optical identification mark,
  a power source,
  a power switch,
wherein said laser beam source comprises a laser diode and said optical element with unique refractive properties is fixed in a random spatial position relative to said casing.

In further embodiment of present invention an optical identification mark is provided comprising a power switch designed to be activated with human thumb.

BRIEF DESCRIPTION OF SEVERAL VIEWS OF DRAWINGS

FIG. 1. General layout illustrating the present invention.

Figure 2:
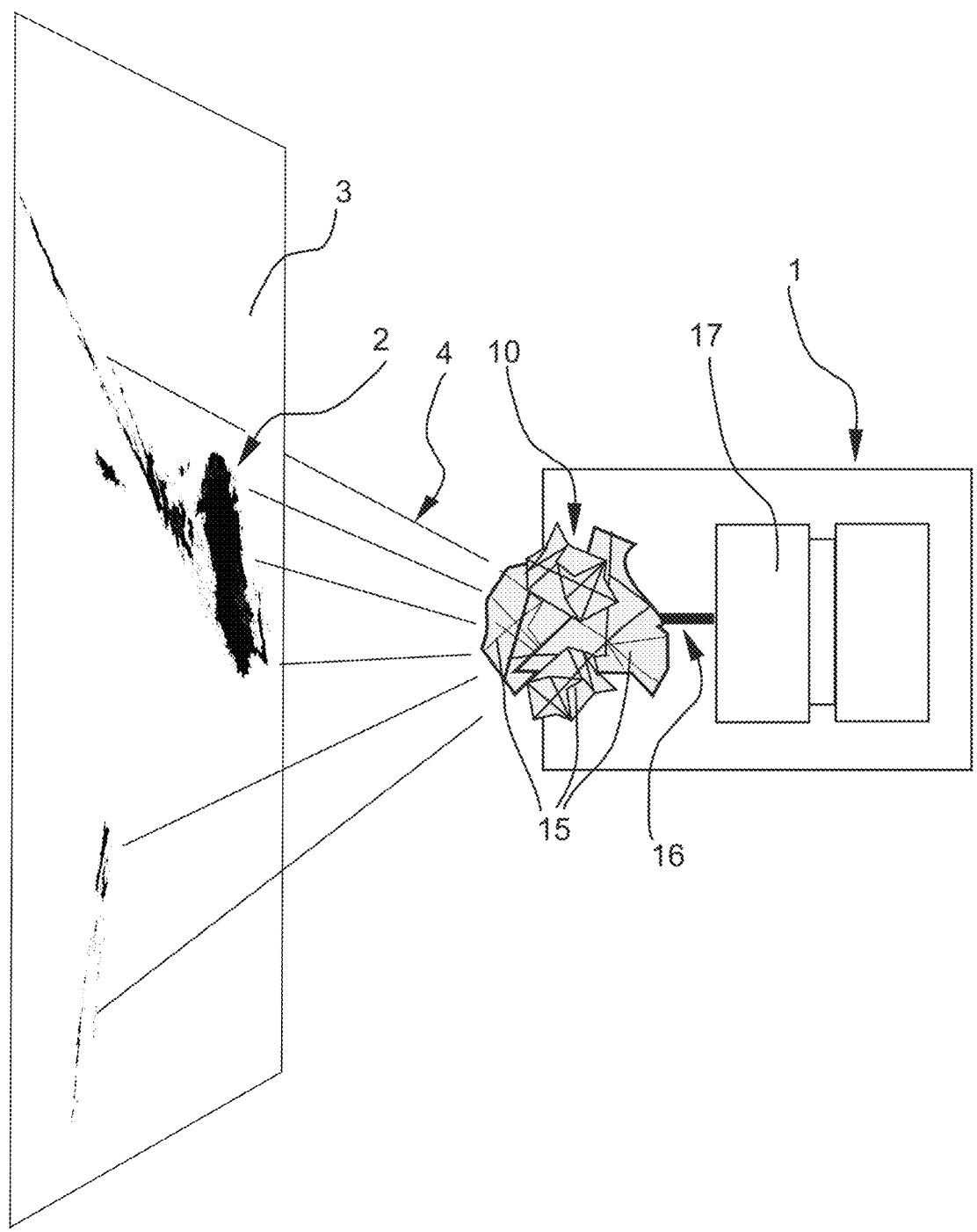

FIG. 2. General layout illustrating forming a unique refractive image of an optical identification mark at screen surface.

Figure 3:
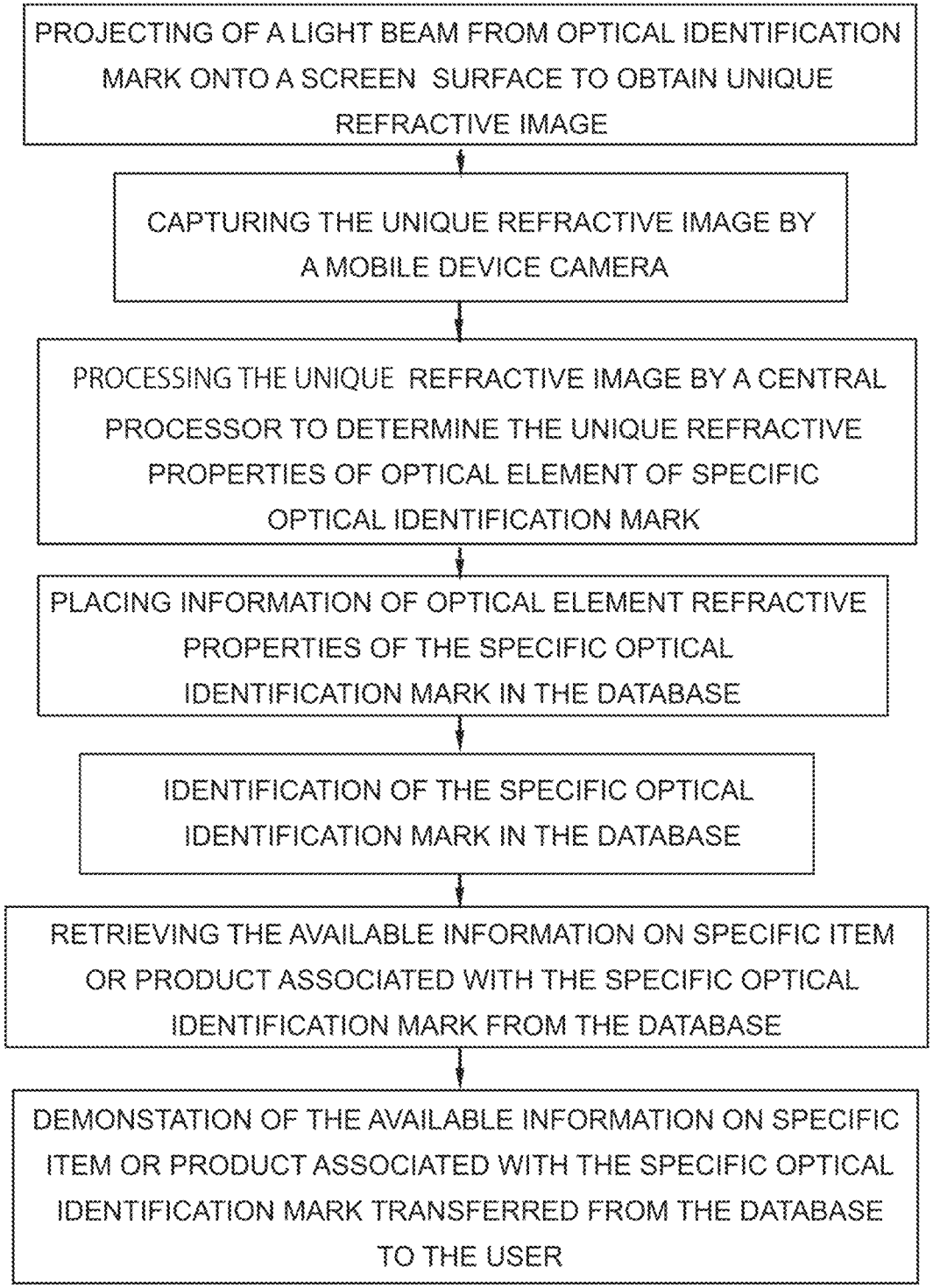

FIG. 3. Block-diagram illustrating the identification of items or products using an optical identification mark according to the present invention.

Figure 4:
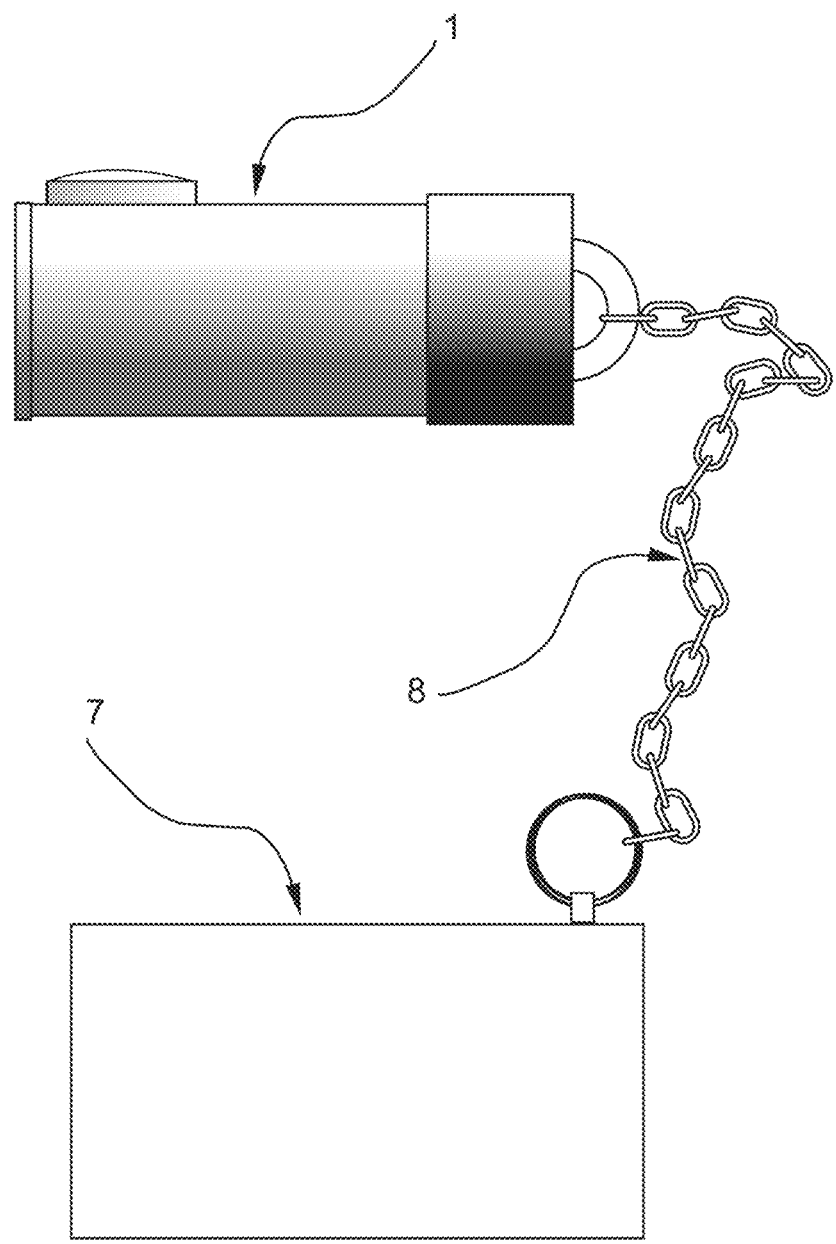

FIG. 4. General view of optical identification mark attached to a tagged item.

Figure 5:
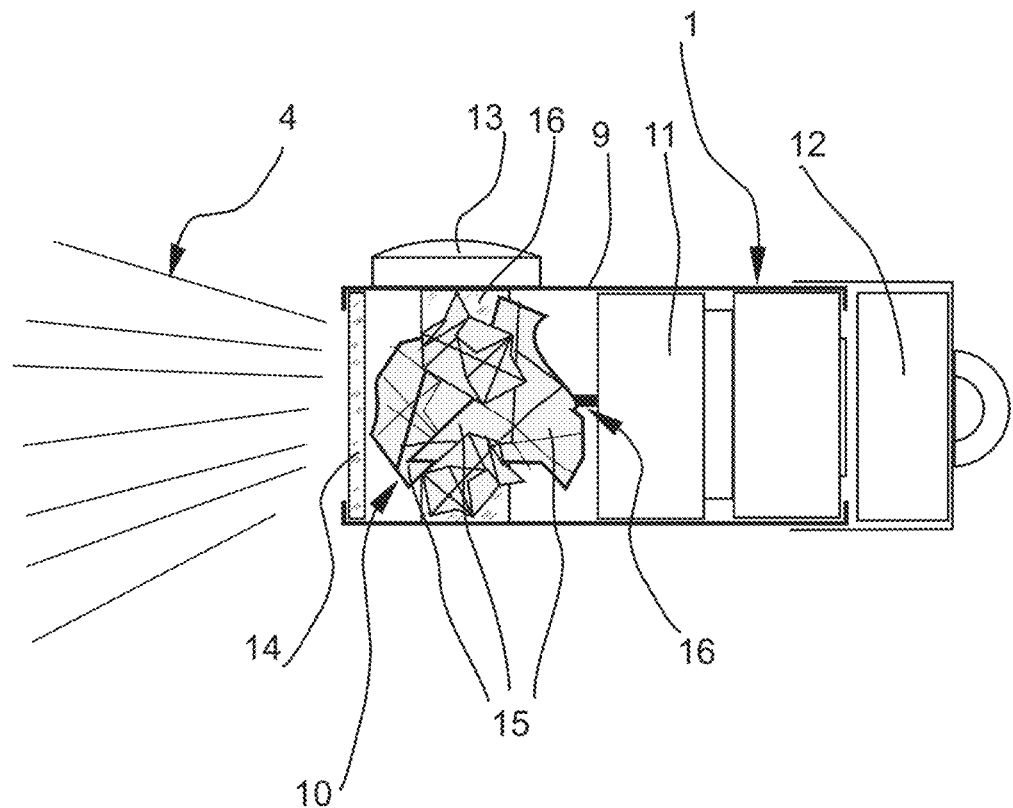

FIG. 5. Cross section of optical identification mark.

DETAILED DESCRIPTION OF THE INVENTION

Inventor provides a system for identification of items and products using an optical identification element with unique optical refraction properties. The system is based on the phenomenon of refraction, i.e. the change in direction of a wave due to a change in its speed, as observed when the wave passes from one medium to another. The most common example is the refraction of light, as happens in the formation of rainbows in the sky or rainbow-like bands when white light passes through a glass prism.

The present invention is described in enabled detail in the following examples, which may represent more than one embodiment of the present invention.

FIG. 1. General layout illustrating the present invention.

The system's core is a laser beam source and an optical element with unique refractive properties, fixed relative to each other, where a laser beam emitted by the laser beam source is directed through the optical element in order to form a light beam (4) with unique properties at optical element output. The laser beam source and optical element are fixed relative to each other in a common casing and together constitute an optical identification mark (1). Additionally, optical identification mark may contain a power source and a power switch.

Since the optical element of the specific optical identification mark is unique in terms of its refractive properties, the laser beam passing through said optical element and the surrounding medium forms the light beam (4) with unique light and shape properties, and, when the light beam is directed to a surface (3) used as a screen(screen surface), it creates a unique refractive image (2) on this screen surface (3), which can be captured by camera of a mobile device (5); and then, using image recognition software, the correspondence of this image with refractive images of optical identification marks array stored in a database can be found; each unique refractive image (2) corresponds to the specific optical identification mark of optical identification marks array. This makes it possible to associate the specific optical identification mark with a specific item or product in the database; and since the optical element of the specific optical identification mark is unique in terms of its refractive properties, a pair of specific optical identification mark/specific item or product cross-validates their authenticity.

As screen surface (3) any preferably flat matt surface such as a room wall, a sheet of paper, etc. can be utilized. As mobile device with camera a smartphone or similar mobile device can be utilized.

Information about unique refractive images of optical identification marks and information about specific item or product associated with said optical identification marks shall be entered into the database with the subsequent identification of the specific optical identification mark by its unique refractive image after the user transfers said unique refractive image to the database with the subsequent determination of specific items or products associated with the specific optical identification mark in the database, and the subsequent transfer of information in the database on said specific items or products to the user.

In order to start the process of identifying an item or a product tagged by means of the specific optical identification mark, the user shall switch on the optical identification mark and direct the outgoing light beam to the screen surface (3); then, capture a refractive image (2) by a camera of a mobile device (5). To order the orientation of the refractive image (2) arising on the screen surface (3) placed in the direction of the light beam propagation (4) coming from optical identification mark (1), the optical identification mark power switch should be configured in a position providing human thumb activation; thereby the user will be forced to hold the optical identification mark in a certain position.

Then, the captured refractive image is processed by the central processor integrated in the mobile device in order to determine its unique characteristics and identify a specific optical identification mark, which in turn is associated in the database stored in the mobile device with a specific item or product information on which is shown to the user on a mobile device at the end of the process.

As an embodiment of the invention, specific optical identification mark identification by its unique refractive image captured by a mobile device camera can be realized using a remote central processor and a remote database; in these circumstances, the mobile device must have built-in communication means by using which the user sends captured refractive image to the remote database for processing by the central processor and specific optical identification mark identifying, similar to the process described above.

Then, the information on the specific items or product stored in the database and associated with the identified specific optical identification mark is transmitted to said mobile device for demonstration to the user.

FIG. 2. General layout illustrating forming a unique refractive image of an optical identification mark at screen surface:

Laser beam source (17) emits laser beam (16) which is directed to the optical element (10) and when passing through it is refracted by numerous edges and curvatures of optical element on the grounds of highly random shape of transparent object or objects (15) forming optical element. Thereby, after passing through optical element the laser beam is transformed into a light beam (4) with unique properties that can be utilized for identification purposes.

To do so the light beam is directed to any preferably flat matt surface (screen surface) (3) placed in some distance from optical element in the direction of the light beam (4) propagation. Such way a unique refractive image (2) is created at the screen surface (3) and that image can be captured by a mobile device camera to be identified and associated with the specific optical identification mark (1).

FIG. 3. Block-diagram illustrating a standard procedure for identifying items or products within the framework of the present invention which includes the following actions:

1. Projecting of a light beam from optical identification mark onto a screen surface in order to obtain a unique refractive image:

step 1—the user switches on the optical identification mark power switch and directs the light beam from a preferable distance of 1 . . . 2 feet onto a screen surface, preferably located at an angle of 70 . . . 90 degrees to the direction of the light beam from the optical identification mark.

2. Capturing the unique refractive image by a mobile device camera:

step 2—in a preferred embodiment of the invention, the capturing is performed by a mobile device equipped with a camera, such as a smartphone or similar device.

3. Processing the unique refractive image by a central processor to determine the unique refractive properties of the optical element of the specific optical identification mark should be as follows:

step 3—as part of the present invention, unique refractive image is processed by a central processor integrated into the mobile device or located remotely;

step 4—enhancing the unique refractive image by highlighting image segments including light with a wavelength corresponding with light emitted by the laser beam source in the optical identification mark;

step 5—determination of optical element unique refractive properties of a specific optical identification mark by means of unique refractive image analysis.

4. Placing information on optical element refractive properties of the specific optical identification mark into the database:

step 6—placing information of optical element refractive properties of a specific optical identification mark into the database.

5. Identification of the specific optical identification mark in the database:

step 7—searching of the optical identification mark in the optical identification mark array database with the refractive properties corresponding with the refractive properties of the specific optical identification mark;

step 8—associating the optical identification mark found in the database with the specific optical identification mark.

6. Retrieving the available information on a specific item or product associated with the specific optical identification mark from the database:

step 9—collecting the available information on the specific item or product associated with the specific optical identification mark in the database;

step 10—transferring the available information on the specific item or product associated with the specific optical identification mark from the database to the user's mobile device.

7. Demonstration of the available information on the specific item or product associated with the specific optical identification mark transferred from the database to the user:

step 11—demonstration of the available information on the specific item or product associated with the specific optical identification mark transferred from the database to the user;

step 12—demonstration of information about all previous information requests associated with the specific optical identification mark transferred from the database to the user.

FIG. 4. General view of optical identification mark attached to a tagged item.

In this embodiment of invention, optical identification mark (1) is physically attached to the tagged item (7) using a connector (8).

FIG. 5. Cross section of optical identification mark.

In this embodiment of invention, optical identification mark (1) consists of a casing (9) containing an optical element with unique refractive properties (10), a laser diode (11), a power source (12), a power switch (13), and a transparent protective cover (14).

In this embodiment of invention, optical element (1) includes several transparent objects (15) of random irregular shape, for example, fragments of broken glass fixed in the optical identification mark using material (16) in a random position relative to each other and optical identification mark casing.

The refractive index of transparent objects (15) constituting the optical element differs from the refractive index of medium surrounding said transparent objects, so a laser beam (16) passing through numerous faces and distortions of the optical element is refracted in a unique way forming a light beam (17) with unique properties at optical element output, which subsequently leaves optical identification mark through the transparent protective cover (14).

It will be apparent to one with skill in the art that the method and system for identification of items using unique optical identification element of the present invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system for identification of items and products comprising:
    a) an optical identification mark associated with a specific item or product, comprising:
        an optical element with unique refractive properties that includes one or more transparent objects of irregular random shape randomly conjugated to each other and the refractive index of the material of said transparent objects differs from the refraction index of the medium surrounding said transparent objects,
        a laser beam source,
    wherein said optical element and said laser beam source are fixed in the optical identification mark relative to each other in a position that allows a laser beam emitted by said laser beam source to pass through said optical element with an output of a light beam with unique properties, formed by said laser beam refracted by said optical element, beyond said optical identification mark, followed by identification of the specific optical identification mark by identifying its unique refractive image appearing on a surface(screen surface) placed in the direction of said light beam propagation, providing the user of system information on the specific item or product associated with the specific optical identification mark;
    b) a database of said unique refractive images of optical identification marks array, wherein each of optical identification marks in turn is associated with a specific item or product;
    c) a mobile device with a built-in camera, built-in means of communication with said database and built-in means of providing information to the user of system, designed to capture said unique refractive image that appears on said screen surface, transfer said unique refractive image to said database, as well as receive and provide the user of system information on the specific item or product associated with the specific optical identification mark in said database;
    d) a central processor designed to determine the characteristics of said unique refractive image of the specific optical identification mark captured by said mobile device camera in order to search for the corresponding unique refractive image stored in said database of the optical identification marks array, each of which in turn is associated with a specific item or product.

2. An optical identification mark of claim 1 further comprising:
    a casing intended for mutual fixation of the elements of the optical identification mark,
    a power source,
    a power switch,
wherein said laser beam source comprises a laser diode and said optical element with unique refractive properties is fixed in a random spatial position relative to said casing.

3. The optical identification mark of claim 1 further comprising said at claim 2 power switch designed to be activated with a human thumb.

* * * * *